UNITED STATES PATENT OFFICE.

OTTO BONHOEFFER, OF ELBERFELD, GERMANY, ASSIGNOR TO THE FARBENFABRIKEN OF ELBERFELD CO., OF NEW YORK, N. Y.

METHYLISOPROPYLCARBINOLURETHANE AND PROCESS OF MAKING SAME.

SPECIFICATION forming part of Letters Patent No. 675,539, dated June 4, 1901.

Application filed October 23, 1899. Serial No. 734,543. (Specimens.)

*To all whom it may concern:*

Be it known that I, OTTO BONHOEFFER, doctor of philosophy and chemist, of Elberfeld, Germany, (assignor to the FARBENFABRIKEN OF ELBERFELD COMPANY, of New York,) have invented a new and useful Improvement in Methylisopropylcarbinolurethane and Process of Making Same, of which the following is a specification.

My invention relates to the preparation of a new pharmaceutical product which is chemically methylisopropylcarbinolurethane or carbamic ether of methylisopropylcarbinol having the formula

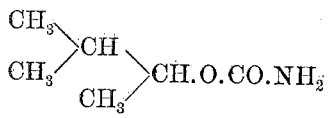

and which possesses valuable therapeutic, especially soporific, properties.

The process for producing my new compound consists in allowing urea or salts thereof to act on methylisopropylcarbinol in a suitable manner.

In order to carry out my process practically, I can, for instance, proceed as follows: Fifteen parts, by weight, of methylisopropylcarbinol are mixed with twenty-one parts, by weight, of urea nitrate, and the resulting mixture is heated in a closed vessel under pressure for, say, five hours at from about 125° to 130° centigrade. After cooling the mass is extracted by means of ether or benzene, and the so-obtained solution is then evaporated. The residue which remains therefrom represents the methylisopropylcarbinolurethane. When recrystallized from ligroin, it forms white needles melting at from 84° to 85° centigrade. It is soluble in water and dissolves readily in alcohol, benzene, ether, and in hot ligroin.

According to my investigations the new compound possesses valuable therapeutic properties and can be used in medicine as a soporific, an average dose being between two and three grams.

Having now described my invention and in what manner the same is to be performed, what I claim as new, and desire to secure by Letters Patent, is—

1. The process for the production of methylisopropylcarbinolurethane which process consists in causing urea nitrate to act on methylisopropylcarbinol, isolating the so-formed methylisopropylcarbinolurethane and subsequently purifying the same, substantially as hereinbefore described.

2. As a new article of manufacture the methylisopropylcarbinolurethane having the formula:

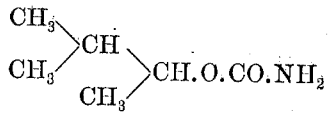

forming when crystallized from ligroin white needles melting at from 84° to 85° centigrade, being readily soluble in alcohol, benzene, ether and in hot ligroin, also soluble in water and adapted for being used in medicine as soporific, substantially as hereinbefore described.

In testimony whereof I have signed my name in the presence of two subscribing witnesses.

OTTO BONHOEFFER.

Witnesses:
R. E. JAHN,
OTTO KÖNIG.